March 28, 1939.  W. S. GRAFF-BAKER  2,151,807

CABLE TERMINAL

Filed June 12, 1937

Inventor
William Sebastian Graff-Baker
By Joel B. Liberman
Attorney

Patented Mar. 28, 1939

2,151,807

UNITED STATES PATENT OFFICE 2,151,807

CABLE TERMINAL

William Sebastian Graff-Baker, Kensington, London, England, assignor to The Benjamin Electric Limited, London, England Application June 12, 1937, Serial No. 147,853
In Great Britain June 18, 1936

5 Claims. (Cl. 173—269)

This invention relates to a device intended for application to an electric cable or conductor at the point at which it is desired to make connection from the cable to a terminal point, and the object of the device is to provide a support for the cable adjacent the point of connection, thus reducing the possibility of fracture of the cable due to vibration or other movement, and also to provide insulation of the cable adjacent this point to obviate short circuits due to two adjacent cables moving into contact.

The known form of cable terminals either of the space or washer type present an unprotected metallic surface and in this form there is the liability of their turning on the terminal points and coming into contact with one another and this is especially so where the terminals are closely spaced.

The invention also has for its object to provide a cable terminal which requires no lengthy operation, such as soldering, in order that it may be used. While the device according to this invention is for the sake of convenience referred to as a terminal it does not necessarily function to conduct current from the cable to the terminal. The device is, however, capable of so operating.

The cable terminal according to this invention may comprise a body of insulating material having a tubular portion at one end adapted to receive a cable or the insulation thereon, and a flattened or pinched together portion at the other end provided with a reinforcing eyelet for engagement over a terminal stud and an aperture in the tubular body adjacent the flattened portion for the passage of the bared end of the cable, the eyelet being adapted to surround the terminal stud and secured thereon by a nut.

Embodiments of the invention are shown in the accompanying drawing in which.

Figure 1:
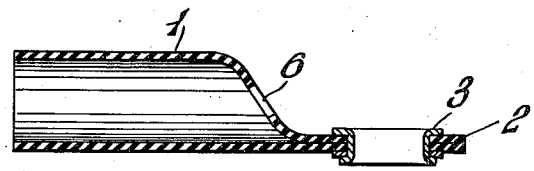
Figure 1 is a sectional elevation of my improved cable terminal.
Figure 2:
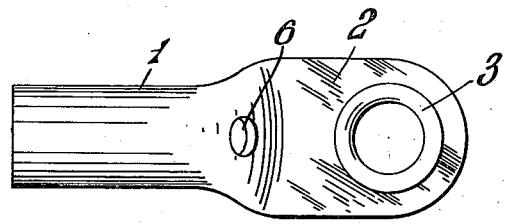
Figure 2 is a plan view of the same.

The terminal consists of a sleeve 1 composed of a short length of tubing of fibre or other non-conducting material which is resilient inherently or is capable of being made resilient the end 2 of the sleeve being flattened or pinched together to form a flat surface which is drilled and secured with a metal eyelet 3 through which is adapted to pass the terminal stud 4 upon which the terminal is to be mounted. The cable 5 with which the terminal is to be used is stripped of its insulation at the end thereof and is inserted into the open end of the sleeve 1 the bared cable 7 emerging through an aperture 6 arranged in the sleeve at a point where the sloping portion passes across the center line thereof and adjacent the eyelet 3. The conductor 7 of the cable is secured under a nut 8 upon the terminal stud which passes through the eyelet 3 in the flattened portion of the sleeve.

The eyelet 3 mechanically reinforces the hole in the fibre in which it is mounted and serves also to fasten together the flattened or collapsed walls of the sleeve. In addition, where a plurality of terminal ends are mounted upon a common stud, the eyelets serve to ensure good contact between the successive cable ends and the common stud.

Figures 3, 4:
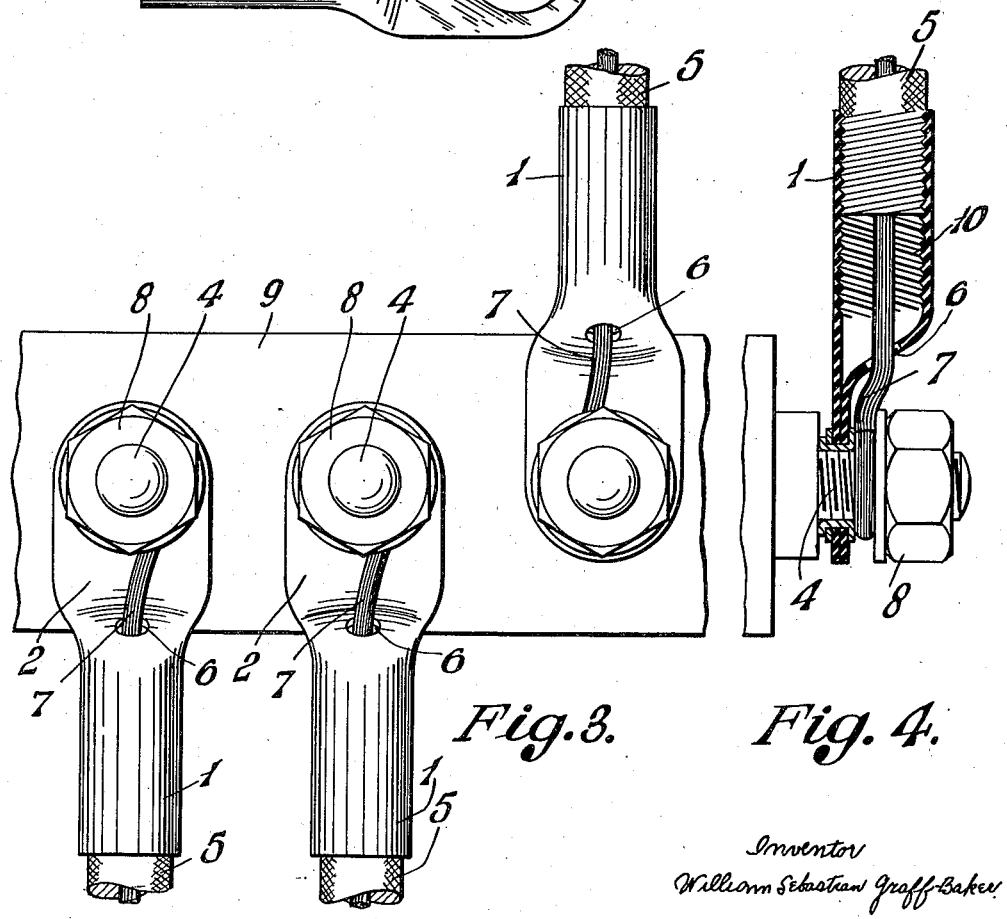
Figure 3 shows a number of such terminals in use and closely mounted together.
Figure 4 is a section of an alternative form of terminal.

In Figure 3 are shown a plurality of terminal studs 4 closely mounted on an insulating plate 9. It will be apparent however that should the terminal ends be rotated about the studs 4 so as to contact one with another, short circuit will not occur.

The sleeve 1 is preferably selected to be of a diameter such as to ensure a close fit on the outside of the cable or its insulating cover and may, if desired, be provided with an internal thread 10 as shown in Figure 4 so as to bite onto the insulation of the cable 5.

What I claim and desire to secure by Letters Patent is:

1. A terminal for an electric conductor, comprising a sleeve of insulating material, opposed portions upon said sleeve deformed one towards the other, said portions having registering apertures therein, and a metallic fastening with an opening therein extending through said apertures with parts of said fastening lying against the outer surfaces of said portions to secure said portions together, said sleeve having a further aperture adjacent said fastening adapted to receive said conductor.

2. A terminal for an electric conductor, comprising a sleeve of insulating material, walls at one end of said sleeve collapsed one towards the other said walls having registering apertures therein, a conducting eyelet secured in said apertures and securing said collapsed walls together, said sleeve having a further aperture therein adjacent said eyelet adapted to receive said conductor.

3. A terminal for an electric conductor, comprising a sleeve of insulating material having the walls thereof pinched at one end so as to present a flattened portion contiguous with the length of said sleeve and a curved portion adjacent said flattened portion and having an aperture in said flattened portion and an aperture in said curved portion adapted to receive said conductor, and a metallic fastening having an opening therein arranged in said aperture in said flattened portion so as to secure in contact the said walls pinched together.

4. A terminal as claimed in claim 3, said curved portion extending across the diameter of said sleeve and said aperture therein being arranged on the axis of said sleeve.

5. A terminal for an electric conductor comprising an internally threaded sleeve of insulating material having the walls of a portion thereof collapsed one toward the other, said collapsed portion of said sleeve having registering apertures therein, and a metallic fastening having an opening therein in said registering apertures serving to hold said collapsed walls in contact, said sleeve having a further aperture adjacent said fastening adapted to receive said conductor.

WILLIAM SEBASTIAN GRAFF-BAKER.